Nov. 18, 1941.  A. BOYNTON  2,262,751
PNEUMATIC PISTON PUMP, DIFFERENTIAL TYPE
Filed Jan. 31, 1939   3 Sheets-Sheet 2
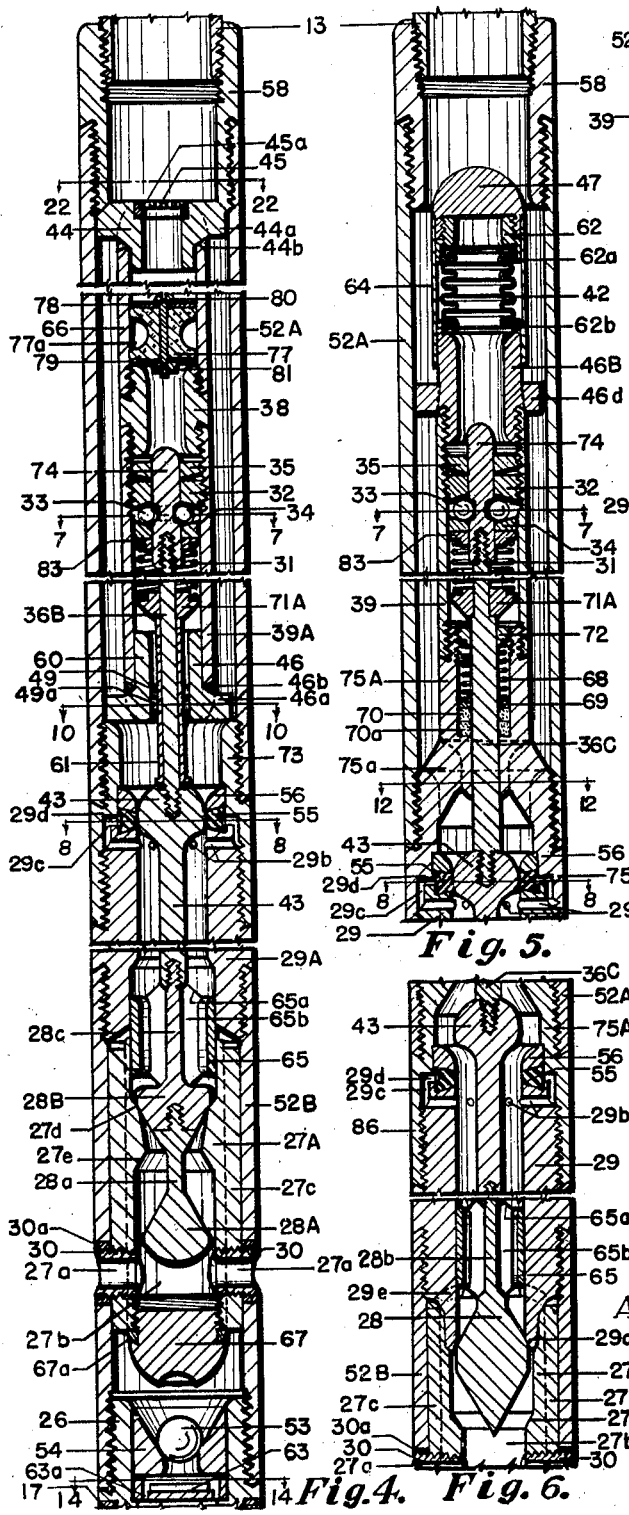
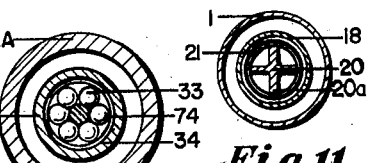
Fig. 7.   Fig. 11.
Fig. 8.   Fig. 12.
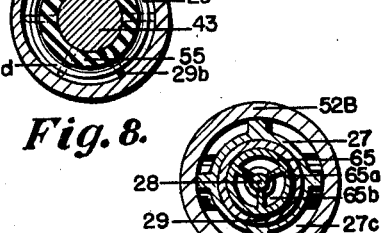
Fig. 9.   Fig. 13.
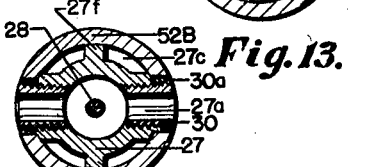
Fig. 10.   Fig. 14.
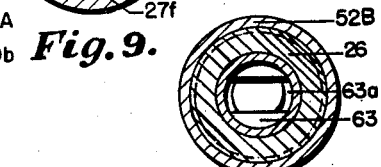
Fig. 15.
ALEXANDER BOYNTON,
INVENTOR,
BY Jesse R Stone
Lester B Clark
ATTORNEYS.

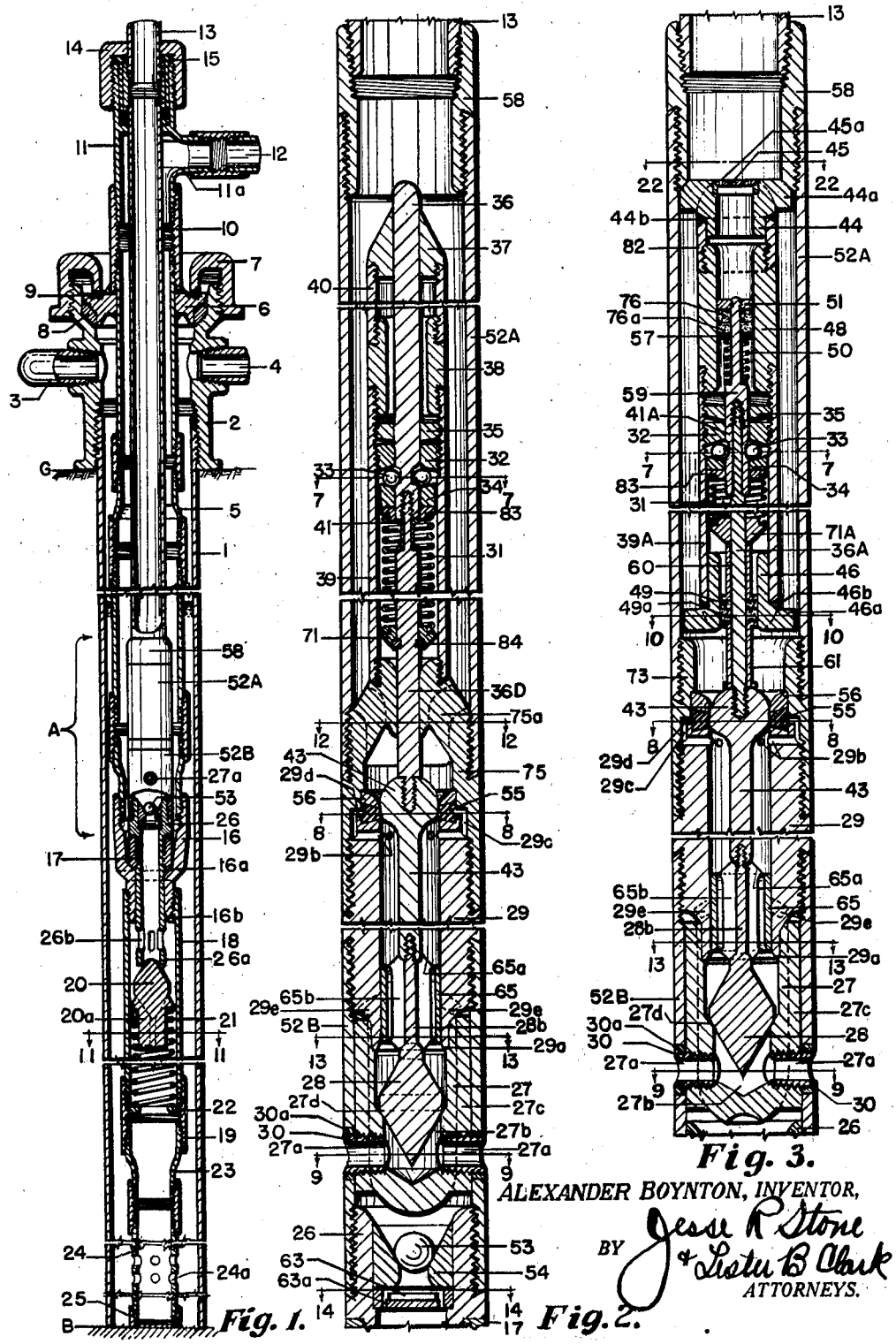

Nov. 18, 1941.  A. BOYNTON  2,262,751
PNEUMATIC PISTON PUMP, DIFFERENTIAL TYPE
Filed Jan. 31, 1939  3 Sheets-Sheet 3

ALEXANDER BOYNTON, INVENTOR,
BY Jesse R Stone
+ Lister B Clark
ATTORNEYS.

Patented Nov. 18, 1941

2,262,751

UNITED STATES PATENT OFFICE 2,262,751

PNEUMATIC PISTON PUMP, DIFFERENTIAL TYPE

Alexander Boynton, San Antonio, Tex.

Application January 31, 1939, Serial No. 253,877

14 Claims. (Cl. 103—232)

My invention relates to a means for lifting liquids from wells and of propelling liquids through pipe lines by the force of compressed air or gas acting under or behind a slug of liquid previously admitted into the eduction tube of a well or into a pipe line by the automatic action of valves which alternately admit a slug of liquid of predetermined weight and then admit under or behind the slug enough compressed air or gas to expel it from the well or pipe line.

The invention relates to and broadly comprehends the subject matter of my copending applications Serial Nos. 253,875 and 253,876.

One of the objects of this invention is to provide a pump for lifting liquids from wells by means of pneumatic pistons thereby eliminating the expensive, complicated, troublesome and unnecessary machinery now generally used to lift liquids from wells.

A further object of this invention is to provide a pneumatic piston pump adapted to use either high or low air or gas pressure for expelling either heavy or light slugs of liquid from wells without requiring any change in construction or adjustment of parts, the device being adapted to automatically regulate the relation between the weight of slug to be lifted and the air or gas pressure used to lift it. Slugs of different weights or lengths may be expelled from wells by means of simply varying the pressure of the air or gas used to lift the slugs. By increasing the air or gas pressure the length or weight of the slug is increased, or vice versa; thereby overcoming the serious difficulty of having to remove the device from the well and of having to change the adjustment in order to cause it to expel slugs of different lengths or weights.

A still further object of this invention is to provide means whereby a great number of wells varying widely in depth and production may each be economically and efficiently pumped by compressed air or gas from one central compressor plant or by gas from any other source by simply regulating the air or gas pressure supplied to each well for the purpose of expelling oil, water, mud fluid, or other liquids therefrom.

Another important object of this invention is to provide a means of lifting liquids from wells, regardless of depth, by the use of compressed air or gas without allowing any of the air or gas pressure to ever contact the well liquids in such manner as to transmit pressure against the producing formations.

And a still more important purpose is to provide the most economical means of lifting liquids, particularly oil, from wells to the end that the ultimate recovery from such wells may be greatly increased.

The slugs of liquid are admitted into the eduction tube of a well or into a pipe line by means of a valve that controls the admission of liquid thereto (hereinafter referred to as the liquid intake valve) after a valve that controls the admission of air or gas thereto (hereinafter referred to as the air or gas valve) moves from one seat, referred to as the first seat, and closes upon another seat, referred to as the second seat. The air or gas valve and the liquid intake valve are urged to the only position in which they are both closed by a spring which may work in conjunction with a latch, the latching means tending to hold the air or gas valve and the liquid intake valve closed in the first position, and tending to hold the air or gas valve closed in the second position while the liquid intake valve is open The force of the air or gas is utilized to hold the air or gas valve seated upon the second seat while the slug of liquid to be expelled is entering the eduction tube or pipeline through the liquid intake valve.

The weight or back pressure of the slug of liquid thus admitted into the eduction tube or pipe line is utilized to unseat the air or gas valve from its second seat, and to hold the air or gas valve open intermediate its two seats, while, in that position, the liquid intake valve cuts off the admission of more liquid until the slug has been expelled; whereupon the air or gas valve again assumes the closed position upon its second seat with the liquid intake valve open. This cycle is automatically repeated during the period of operation.

With the above and other objects in view this invention has particular relation to certain novel features of construction, operation, and arrangement of parts which can manifestly be changed and combined in different ways within the scope and purpose of this invention.

Other objects and advantages of this invention will be apparent from the following description as illustrated in the accompanying drawings in which:

Fig. 1 is a partial vertical section of a well equipped with this device.

Fig. 2 is a vertical section of the device showing the air or gas valve closed upon its first seat.

Fig. 3 is a vertical section of a modified form of the device shown in Fig. 2, showing the air or gas valve closed upon its first seat.

Fig. 4 is a vertical section of another modified form of the invention shown in Figs. 2 and 3, showing the air or gas valve closed upon its first seat.

Fig. 5 is a vertical section of the upper portion of a modified form of the invention shown in Figs. 3 and 4.

Fig. 6 is a vertical section of a portion of the device shown in Figs. 2 and 3, showing the air or gas valve closed upon its second seat.

Fig. 7 is a horizontal section on the line 7—7, Figs. 2, 3, 4 and 5.

Fig. 8 is a horizontal section on the line 8—8, Figs. 2, 3, 4 and 5.

Fig. 9 is a horizontal section on the line 9—9, Figs. 2 and 3.

Fig. 10 is a horizontal section on the line 10—10, Figs. 3 and 4.

Fig. 11 is a horizontal section on the line 11—11, Fig. 1.

Fig. 12 is a horizontal section on the line 12—12, Figs. 2 and 5.

Fig. 13 is a horizontal section on the line 13—13, Figs. 2 and 3.

Fig. 14 is a horizontal section on the line 14—14, Figs. 2 and 4.

Fig. 15 is an end view of a U key used in the construction as illustrated in Fig. 2.

Identical characters are employed to designate and refer to corresponding parts throughout the drawings.

Figure 16:
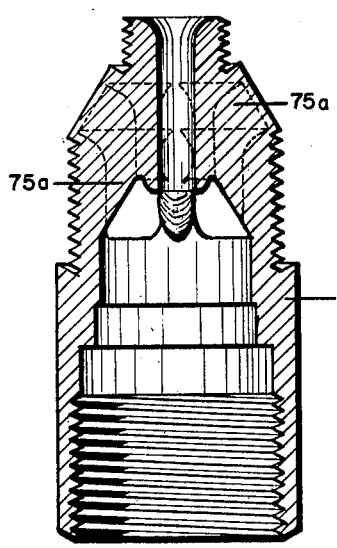
Fig. 16 is a longitudinal section of a ported connection shown in Figs. 2, 5 and 17.
Figure 20:
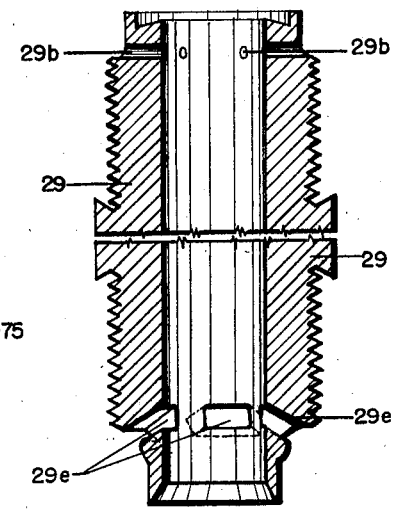
Fig. 20 is a longitudinal section of the connection and valve sleeve chamber in Figs. 2, 3, 5, 6, 8, 13, and 21.
Figure 23:
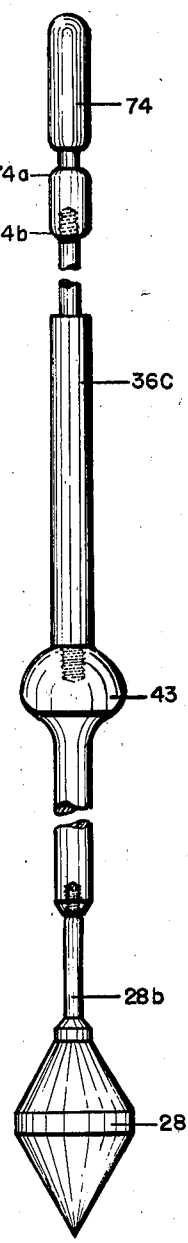
Fig. 23 is an outside view of the assembly of valves and shafts in Figs. 5 and 6.

Fig. 1 shows a well equipped with this device in which outer casing 1 is sealed above ground surface G by casing head 2 having two openings one of which is closed by bull plug 3, the other being connected with a pipe line 4 for the purpose of conveying away gas produced by the well. The pressure tube 5 is suspended centrally within casing 1 and proximate its upper end rests upon a plate 6 to which it may be welded or otherwise joined in leak proof contact therewith. Cap 7 is then screwed down upon lead ring 9, at the same time compressing lead ring 8, to form a seal against the escape of formation gas from the well. Any other casing head arrangement that will afford a seal between the well casing and the pressure tubing may be used; many such casing heads being well known to the art.

Pressure tube 5 extends above the casing head and is connected by means of a coupling 10 with a T 11 having a lateral branch 11a connected to the air or gas line 12. The upper end of said T is formed to support the eduction tube 13 which is closed about by packing gland 14 which clamps packing 15 producing a hermetical seal between pressure tube 5 and eduction tube 13. The pressure tube 5 may be of one diameter throughout its length or it may be swaged to a different diameter for part of its length as shown. The pressure tube is connected at its lower end to a swaged coupling 16 which has a tapered seat 16a to be engaged by lead seal 17 poured on or otherwise secured upon the eduction tube proximate the lower end thereof.

The lower end of the swaged coupling 16 is connected to a tubular housing 18 connected at its lower end to coupling 19. Within the housing 18 is a valve 20 held resiliently upon upper end of spring 21 to normally engage a seat 16b at the lower end of the swaged coupling 16. Said spring 21 rests upon an annular plate 22 in the coupling 19. Below the coupling 19 the tubing may be extended downwardly as far as is desired, and I have shown the same as connected through a nipple 23 to a perforated pipe 24 having openings 24a therein and closed at its lower end by a cap 25. The tubing may be extended to rest on bottom of the well B as shown in Fig. 1, or it may be allowed to hang from the casing head with its lower end anywhere below annular plate 22.

While the pressure tubing 5 is being lowered into the well, seal valve 20 contacts seat 16b upon which it is held by the force of the seal valve spring 21 plus the fluid pressure in the well. When the flow tubing is lowered into the position shown in Fig. 1, the slotted extension 26a forces the seal valve down to the position shown in Fig. 1 whereupon well liquid is free to enter the device. This action of the valve 20 which keeps well liquid out of the pressure tubing while flow tubing is being lowered or withdrawn is very important in that high flow starting pressures are thereby avoided as is explained in my prior Patent 2,104,008.

Compressed air or gas is supplied into the pressure tubing from an outside source through pipe line 12 if the well does not produce enough gas to flow it, as illustrated in my prior Patents 2,042,583 and 2,104,008.

Double air or gas valve 28 is interposed in the path of the air or gas flow from the pressure tubing 5 into the flow tubing 13. Latch spring 31 installed under some compression normally forces double air or gas valve 28 to engage its first seat 27d within air or gas connection member 27. The lower end of spring 31 rests upon spring shoe 71 held in place by U key 84 engaged upon latch shaft sub 36D and fitting within the lower end of this spring shoe as shown in Fig. 2.

The upper end of spring 31 engages within a circular recess upon the under side of upper spring seat 83 which urges ball floor 34 to engage latch balls 33 upon ball roof 32 secured in place by lock nut 35. Ball roof and floor are beveled as shown for the obvious purpose of urging the latch balls inwardly by the force of spring 31. The latch assembly is housed by nipple 39 threadably engaged at its lower end with an upwardly extending internal boss of ported connection 75 and threadably connected at its upper end with chamber connection 38 to the upper end of which chamber nipple 40 is threadably joined, closure plug 37 being used to close the upper end of said nipple and at the same time to provide a guide for latch shaft 36 which has a close working fit through the central bore in said plug.

Latch sleeve 41 has a close fit over the upper reduced diameter of latch shaft sub 36D and is locked in position by the threaded engagement between shaft 36 and sub 36D as shown in Fig. 2. The length of latch sleeve 41 determines the inward travel of latch balls 33 and consequently the latching force exerted at either end of the latch travel. Assuming a constant overall length of latch shaft 41, if the upper enlarged section of the member be longer the latch balls will not roll over so far on the upstroke of the valves, and vice versa. The chamber formed within tubular connections 38, 39 and 40 may be filled with a lubricant to insure long life and easy working of the latch. A somewhat similar latching means is shown in my prior patents 1,968,633, 2,006,909, 2,010,135, 2,042,583, 2,054,924 and 2,104,008.

In connection with the latch here shown it should be noted that latch shaft sub 36D has a close working fit within the central bore through the upper end of connection 75 similar to the fit of latch shaft 36 through plug 37. Members 36 and 36D being of the same diameter, there is no tendency of the latch to pull a vacuum or become impinged upon the lubricant within the latch housing as the latch moves in either direction. Ample clearance is provided between all members of the latch which might otherwise impede the free movement of the lubricant, but the clearance between members 36 and 37 is such as will not allow well liquid to enter the latch chamber and the clearance between members 36D and 75 is such as will not allow the lubricant to leak out of the latch chamber. The purpose of spring 31 is two-fold, first, its upward thrust is utilized to operate the latch, second, its downward thrust is utilized to urge valve 28 in the direction of its first seat 27d upon which seat it normally engages.

In this connection it should be noted that the latch is not wholly essential to satisfactory working of this device but will improve the action thereof under many of the varying conditions found in wells, particularly oil wells in some of which it will be found best to adjust the latch to hold the air or gas valve on its first seat only or to hold this valve on its first seat with greater force than it holds the valve upon its second seat.

Figure 17:
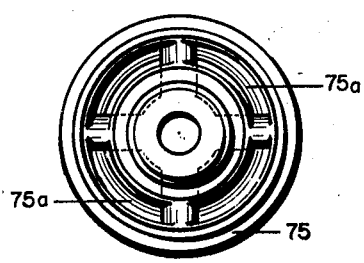
Fig. 17 is a top view of Fig. 16.
Figure 21:
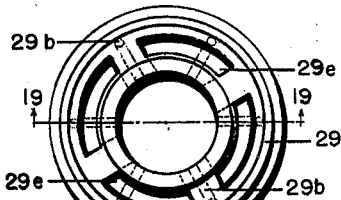
Fig. 21 is a bottom view of the part shown in Fig. 20.
Figure 18:
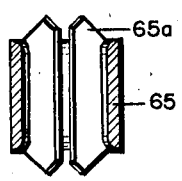
Fig. 18 is a longitudinal section of the liquid intake slide valve in Figs. 2, 3, 4, 6, 13, and 19.
Figure 22:
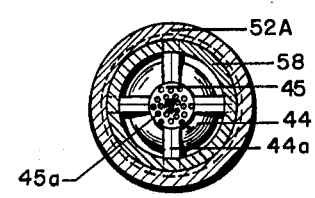
Fig. 22 is a horizontal section on the line 22—22, Figs. 3 and 4.
Figure 19:
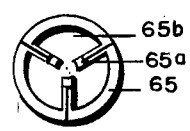
Fig. 19 is a top view of the part shown in Fig. 18.

Liquid intake leak proof valve 43 is threadably connected to sub 36D above and to the air or gas valve 28 below, liquid intake slide valve 65 being pressed over upper extension 28b and locked in place by the threaded connection between member 28b and the downward extension of valve 43 as appears in Figs. 2, 3 and 6, this valve being detailed in Fig. 17. Flow tubing 13, connection 58, upper case nipple 52A, ported connection 75, ported connection and valve sleeve member 29, air or gas intake connection member 27, and lead seal carrier nipple 26 are threadably joined together as shown in Fig. 2.

Within connection 75 metallic ring 56 is pressed in against a shoulder as shown to form the upper retainer for yieldable ring 55 held in place by the upper end of member 29. Slide valve 65 has a close working fit within the central bore through member 29. The second seat 29a for the air or gas valve 28 is formed upon the lower annular extension of member 29, a bore to tightly contain said extension being provided in the upper end of member 27 as appears in Figs. 2, 3 and 6. Member 27, which may be a casting turned to size and pressed into lower case nipple 52B, is further secured in place by air or gas intake nipples 30 screwed into opposite sides of member 27 through circular openings in case 52B and soldered around within said circular openings as shown at 30a. Fins 27f, Fig. 9, hold member 27 central within case 52B while soldered-around nipples 30 secure member 27 against vertical movement.

Check valve 53 normally rests upon seat 54 which may be pressed down upon liquid intake governor 63, the purpose of the check valve being to prevent air or gas pressure admitted into the flow tubing from contacting the producing formations of the well. Whenever the pressure above valve 53 is greater than the pressure of the well liquid below it this valve will, of course, close. The purpose of the liquid intake governor is to restrict the inflow of well liquid through slots 63a, Figs. 2, 4 and 14, so as to prevent sand or other abrasive substances frequently found in well liquids from unduly cutting or abrading the device.

The device shown in Fig. 2 being installed in the bracketed space A as shown in Fig. 1, all valves will remain closed until compressed air or gas is turned into the pressure tubing 5 via pipe line 12 and the pressure entering chamber 27b via openings 27a in nipple 30 is built up high enough to spring the latch and drive the valve 28 from its first seat 27d to its second seat 29a. It is presumed that the latch is adusted to hold valve 28 upon its first seat with enough force to compress spring 31 the full distance of the valve travel when the latch releases. Valve 28 will remain seated upon its second or upper seat 29a until enough well liquid enters the flow tubing to exert sufficient back pressure upon the top of valve 28 to unseat it with the aid of the expansive force of spring 31.

When air or gas valve 28 is engaged upon its second seat 29a the latch should hold with enough force to produce sufficient recession of the valves to close valve 65 by forcing the lower end of it downward past ports 29e when the latch releases. It should be here noted that more downward movement is required to close valve 43 than will close valve 65. When liquid intake valve 65 and leakproof valve 43 are wide open, that is when air or gas valve 28 is upon its upper or second seat, well liquid enters the flow tubing via perforations 24a, through spring 21, between fins 20a, by valve 20, through slots 26b and liquid intake governor slots 63a, by valve 53, through ports 27c, 29e, through openings 65b between partitions 65a of slide valve 65, and ports 75a, this position of the valves being shown in Fig. 6.

It will be noted that all valves move in unison, that the air or gas valve is closed in both positions of extreme travel, and that a slight recession of the valves from their extreme upper position opens the air or gas valve 28, closes the liquid intake valve 65, and leaves valve 43 still open. The clearance between valve 28 and its chamber is sufficient to allow enough compressed air or gas to pass through this clearance to flow the well whenever the valve is positioned intermediate of seats 27d and 29a. Each time a slug of well liquid enters the flow tubing and is expelled as stated, the air or gas valve seals off upon seat 29a, thus again opening the liquid intake and repeating the operation as long as well liquid and compressed air or gas are supplied to the device.

The relation of the three valves and the function of each will now be stated. Valve 28 controls the admission of compressed air or gas from the pressure tubing 5 to the flow tubing 13. On its first seat 27d it constitutes a barrier against the well liquid (if any should leak past valve 65) entering the pressure tubing while the well is standing between operating intervals. In this connection it is proper to observe that many oil wells of small production are pumped at intervals. During these intervals it is important that no well liquid be allowed to enter the pressure tubing because this would increase the air or gas pressure required to initiate the flow. On its second seat 29a valve 28 prevents the compressed air or gas in the pressure tubing from aerating the liquid slug while the same is entering the eduction tube. Valve 28 is the first of the three valves to open on the up stroke and the last to close on the down stroke.

Slide valve 65 which controls the admission of well fluid to the eduction tube is closed (covers ports 29e) when air or gas valve 28 is closed upon its first seat 27d as appears in Figs. 2, 3 and 4 and is open when valve 28 is closed upon seat 29a as appears in Fig. 6. Slide valve 65 again closes at slight movement of valve 28 away from seat 29a. With relation to the other two valves 28 and 43 valve 65 is the last to open on the up stroke and the first to close on the down stroke as clearly appears from an examination of these valves in their relative positions in Figs. 2 and 6. The office of leakproof valve 43 is to prevent well liquids that may leak past valve 65 from entering the flow tubing while the device is not being operated.

In the closed position shown in Fig. 2 fluid leaking past valve 65 enters passages 29b, the annular space 29c and the opening 29d to contact the outer surface of yieldable ring 55 thereby to cause the inner surface of this ring to seal tightly against the valve 43. Obviously the greater such pressure the tighter will be the seal produced thereby. On the up stroke of the valves this valve is the second to open, the first to open being valve 28. On the down stroke valve 43 is the second to close, the first to close being the liquid intake valve 65, and the last to close being air or gas valve 28 contacting seat 27d.

From the foregoing it will be observed that on the upstroke the valves open in the following order 28—43—65, and that they close on the down stroke in the order of 65—43—28.

The difference between the weight of the slug and the air or gas pressure used to expel it equals, and is determined by, the force required to compress spring 31 far enough to allow valve 28 to contact seat 29a plus whatever force the latch employs in the uppermost position of the valves. The weight of the slug may, therefore, be increased by increasing the air or gas pressure, and vice-versa. Increasing the air or gas pressure decreases the percentage of difference between the air or gas pressure and the weight of the slug, and vice versa, while the actual difference between them remains constant.

The device and all modifications thereof shown in this application may be installed in all the ways shown in my herein before mentioned prior patents.

Fig. 3 shows a modified form of the invention shown in Fig. 2, and which may be installed within the bracketed space A, Fig. 1 in the same manner and operated in the same way as was described for the device shown in Fig. 2.

The valve action is the same as in Fig. 2. A somewhat different latching mechanism and a slight change in the construction of valve housing connection 73 as compared with ported connection 75 in Fig. 2 constitute the only change in construction as compared to the device shown in Fig. 2.

In the latch assembly wings 44a of the winged vent plug 44 contact the lower beveled ends of connection 58 and hold the upper end of the latch assembly central of case 52A, plug 44 being preferably welded or soldered to nipple 82 at 44b. The lower end of the latch assembly is held central of case 52A by wings 46a. Screen plug 45 is pressed or otherwise secured into the top of plug 44. Passages 45a provide that fluid may come and go into and out of the chamber immediately below without impeding the action of the latch. The passages 45a are of such small diameter that sand and other solids are thereby kept from entering the chamber above nut 51 in order that the movement of this nut, which has a working fit in the central bore through connection 48, and the compressible washers 76 and 76a may not be impeded. The working parts of the latch are housed by plug 44, screen plug 45, spacer nipple 82, housing connection 48, latch housing nipple 39A, and winged plug 46 soldered or welded to nipple 39A at 46b, as appears in Fig. 3.

Latch shaft sub 36A threadably connected to the upper end of valve 43 has a slip fit within tubular spacers 60 and 61 between which yieldable washers 49 and 49a are held by the expansive force of spring 31 as shown in Fig. 3. The upper end of spacer 60 supports spring shoe 71A which also has a slip fit over latch shaft sub 36A. The upper end of shoe 71A is circularly recessed to receive the lower end of spring 31 upon the top end of which upper spring seat 83 engages and supports ball floor 34 in contact with latch balls 33 held against ball roof 32 by the expansive force of spring 31 always under some compression. Lock nut 35 secures the ball roof in position to cause the latch balls to engage the upper end of latch sleeve 41A as shown.

Spring 50 under some compression with its lower seat upon the top of the lower enlarged section of packing shaft 59 supports packing washer 57 which urges compressible washers 76 and 76a against nut 51. Washers 76, 76a, 49 and 49a may be of felt or other compressible material. The purpose of these washers is to confine a lubricant within the chamber housing the latch and to exclude foreign substances therefrom. It is apparent that latch sleeve 41A serves to contact the latch balls in the same manner as the very similar part 41 in Fig. 2.

Fig. 4 shows another modification of the device illustrated in Fig. 2. The valves 28A and 28B, spaced apart and connected by shank 28a, perform the office of valve 28 in Figs. 2 and 3. Seat 27d in Figs. 2, 3 and 4 is for the closure formed by the air or gas valve in its first position and seat 29a in Figs. 2 and 3 corresponds to seat 27e in Fig. 4. Air or gas intake connection member 27A corresponds to member 27 of Figs. 2, 3 and 6, member 29A corresponds to the member 29 in Figs. 2, 3 and 6, and latch shaft sub 36B corresponds to the very similar sub 36A shown in Fig. 3. Air or gas valve shank 28c corresponds to the shank 28b in Figs. 2, 3, 6 and 23.

Plug 67, which closes the opening through which valve 28A is inserted, seals the lower end of chamber 27b by screwing down upon packing ring 67a. All other parts shown in Fig. 4 are thought to be so nearly like the corresponding parts in Figs. 2 and 3 as to require no further discussion except to note that cork barrier 77, slidable within nipple 66, takes the place of washers 76 and 76a in Fig. 3. Bolt 80 and nut 81 enable plates 78 and 79 to be drawn together compressing barrier 77 enough to force it out against the wall of the nipple 66, annular recess 77a being for a lubricant. As the latch operates this barrier moves up and down to prevent the displacement caused by the vertical movement of latch shaft 74 from impeding the action of the latch. Arcuate surfaces 74a and 74b (Fig. 23) are merely enlarged showings of means for engaging the latch balls, this construction being similar in all forms of the invention.

In Fig. 5 another means is shown for absorbing the displacement caused by the movement of the latch shaft 74 and sub 36C. For this purpose the lower end of metallic bellows 42 is soldered or welded upon end of winged plug 46B at 62b, the upper end of the bellows being closed by soldering to connection 62 at 62a over which plug 47 is threaded. A sleeve 64 is attached to plug 47 and its lower end has a sliding fit over the upper end of plug 46B. The bellows will expand and contract as the latch shaft travels up and down, thus accommodating the displacement occurring within the latch housing chamber. Wings 46d serve to hold plug 46B central within case nipple 52A. Washers 70 and 70a which may be of felt or other suitable material are urged downward by spring shoe 69 resiliently held in a central recess within ported connection 75A by spring 68, under some compression, held in place by threaded ring 72. These washers prevent the escape of a lubricant in the latch chamber and at the same time keep sand and other foreign substance from obstructing the latch.

It is to be understood that references in the specification and claims to positions and directions such as "upper" and "lower," "upward" and "downward," "above" and "below" apply to the device as illustrated in the drawings wherein the upper portion of the device is shown as uppermost. It is obvious that mechanical changes may be made in the structure, and equivalents may be substituted for the parts shown and I reserve the right to make such mechanical changes, substitutions and adaptations within the scope of the invention as comprehended by the appended claims.

What I claim is:

1. A fluid lift device comprising a pressure tube, an eduction tube therein, a valve assembly at the lower end of the eduction tube, said assembly including a valve housing having a flow communication with the lower end of the eduction tube, a seal between the lower end of the housing and the pressure tube, a gaseous fluid passage from the pressure tube to the interior of the valve housing, upper and lower valve seats in said passage, liquid passages in the walls of the housing to admit liquid from below said seal to ports above said valve seats, said ports opening radially inwardly to the interior of the valve housing, a liquid intake valve seat in the passage above said ports and a valve member adapted to move longitudinally of the passage by the gaseous fluid to close the passage and open said ports to admit liquid through the liquid passages to the eduction tube.

2. A fluid lift device comprising concentric pressure and eduction tubes having a seal therebetween at the lower end of the eduction tube, said eduction tube including a valve housing having a passage for gaseous fluid thereto from the pressure tube and a flow communication with the lower end of the eduction tube, upper and lower valve seats in said passage, liquid by-pass passages from below said seal to inwardly opening ports in the wall of the valve housing above said seats, a valve assembly including a first valve member in the first mentioned passage to move longitudinally thereof to engage one of said seats, and a second valve member to move in unison with the first valve member and to uncover said ports only when the first valve member is closed upon the other of said seats.

3. In a device of the class described, a valve housing having an axial passage therein, a valve assembly including a valve rod in said passage, a liquid intake valve on said rod, a liquid admission valve below the intake valve to admit liquid to the passage only after the liquid intake valve has opened a predetermined amount, a liquid intake passage to admit liquid to the liquid admission valve and means for admitting gaseous pressure fluid to the passage to actuate the valve assembly to alternately admit liquid and the pressure fluid to the passage whereby the liquid is aerated and lifted within the passage.

4. In a device of the class described, a valve housing having an axial passage, a valve assembly in said passage, said assembly including a liquid intake valve, a liquid admission valve below said intake valve to admit liquid to the passage after the liquid intake valve has opened a predetermined distance, a liquid intake passage to admit liquid to the admission valve, spaced seats in the axial passage below said intake valve, and a pressure fluid actuated valve below the liquid admission valve to control the flow of pressure fluid into the passage and movable into engagement with the uppermost of said seats to move the valve assembly upward and close the passage at its lower end when the admission valve is open.

5. In a device of the class described, a valve housing having an axial passage, a valve assembly in said passage, said assembly including a valve rod, a liquid intake valve, an admission valve and a gaseous pressure actuated valve in spaced relation on said rod to control the flow of pressure fluid into the passage, a liquid intake passage to admit liquid to the admission valve, upper and lower valve seats in said housing for said last mentioned valve, means normally holding the valve assembly downwardly with the valves in closed position, and means for admitting a gaseous pressure fluid below the actuated valve to lift the assembly and to open the intake and admission valves, as the pressure actuated valve is moved from the lower valve seat to the upper valve seat.

6. In a device of the class described, a valve housing, upper and lower valve seats therein, a fluid passage in the walls of the housing to admit liquid upwardly to an inwardly opening port in the wall of the valve housing to the interior thereof above said seats, a valve rod, a valve member on said rod adapted to move into engagement with either of said seats, and a second valve member on the rod and adapted to uncover said port only when said first mentioned valve member approaches the upper valve seat.

7. In a device of the class described, a valve housing, spaced seats therein, a fluid passage in the walls of the housing to admit liquid past said seats to inwardly opening ports in the wall of the valve housing to the interior thereof above said seats, an additional valve seat beyond said ports, a valve assembly in said housing, said assembly including a valve member adapted to move into seating engagement with either of said spaced seats, and spaced valve elements operatively connected to said valve member to uncover said ports and open the passage through the housing as the valve member approaches one of the seats.

8. In a flow device for wells, a pressure tube, an eduction tube therein, a seal between the eduction tube and the pressure tube proximate the lower end thereof, said tubes having an annular space between them, pressure fluid in said annular space, a valve housing in said eduction tube proximate its lower end, transverse inlet openings in said housing for pressure fluid, a passage for pressure fluid in said housing axial thereof and communicating with said inlet openings, a passage for well liquid through said housing longitudinally thereof by-passing said inlet openings and terminating in radial openings into said passage for pressure fluid, a double ended valve member of a valve assembly in said passage for pressure fluid, spaced seats alternately engageable by said valve member in said pressure fluid passage, there being clearance around said valve member in said passage, a sleeve valve in said assembly, said valve having longitudinal openings for pressure fluid, said valve being adapted to close said radial openings when said double ended valve is engaged upon the lower of said two seats, a piston valve in said assembly, said valve being slidable in said passage for pressure fluid above said radial openings, that portion of said passage being also adapted for the flow of well liquid therethrough, a larger opening than said last passage proximately above the same to allow said piston valve to open when said double ended valve member engages the upper of said two seats, radial openings for well liquid and pressure fluid, said openings communicating between said larger opening and the flow passage through said eduction tube, a rod connected to said piston valve and extending upwardly therefrom, a shell surrounding upper end of said rod, and a latch in said shell, said latch being to delay and accelerate the movements of said valve assembly.

9. In a device of the character described, a pressure tube, an eduction tube therein, said eduction tube having clearance within said pressure tube, pressure fluid in said clearance, a valve housing in said eduction tube proximate its lower end, inlet openings in said housing for pressure fluid, a passage for pressure fluid within said housing axial thereof and communicating with openings into said clearance, a passage for well liquid through said housing longitudinal thereof and by-passing said openings, said last passage terminating in radial openings into said housing, a valve assembly including a double valve member having confronting valves movable between two seats in said passage for pressure fluid and adapted to control the flow thereof through said passage, said member having a portion of reduced diameter between said valves and said passage having a portion of reduced diameter between said seats, a sleeve valve connected to said double valve member in said passage, said sleeve valve having longitudinal openings and being adapted to close said radial openings for well liquid when the upper of said double valves is engaged upon the upper of said two seats, a rod extending outwardly from said valve assembly and latching means engaging said rod and connected to said sleeve valve to cause quick movements of said valve assembly in both directions.

10. In a device substantially as described, an eduction tube including a valve housing, a double ended valve member therein, said member being adapted to move from one seat to another in a passage for pressure fluid in the valve housing, said member closing said passage when either one of its valves is engaged upon one of said seats and said passage being open when said member is intermediate said seats, a well liquid inlet to said passage, a sleeve valve adapted to close the well liquid inlet to said tube when said double ended valve is closed upon the lower of said seats and to open said inlet when said double valve member is engaged upon the upper of said seats, said sleeve valve having longitudinal openings for pressure fluid and well liquid; and a latch in said tube above said sleeve valve, said latch being adapted to cause sudden movement of said valves in both directions.

11. In a device substantially as described, an eduction tube including a valve housing, a double ended valve member therein, said member being adapted to move from one seat to another in a passage for pressure fluid in the valve housing, said member closing said passage when either one of its valves is engaged upon one of said seats, and said passage being open when said member is intermediate said seats, a well liquid inlet to said passage, a sleeve valve adapted to close the well liquid inlet to said tube when said double ended valve member is closed upon the lower of said seats and to open said inlet when said member is engaged upon the upper of said seats, said sleeve valve having longitudinal openings for passage therethrough of pressure fluid and well liquid.

12. In a device substantially as described, an eduction tube including a valve housing, a double ended valve member therein, said member being adapted to move from one seat to another in a passage for pressure fluid in the valve housing, said member closing said passage when either one of its valves is engaged upon one of said seats, and said passage being open when said member is intermediate said seats, a well liquid inlet to said passage, a sleeve valve adapted to close the well liquid inlet of said tube when said double ended valve is closed upon the lower of said seats and to open said inlet when said valve member is engaged upon the upper of said seats, said sleeve valve having longitudinal openings for pressure fluid and well liquid, a piston valve in said eduction tube above said sleeve valve, said piston valve being adapted to close the liquid passage through said tube when said other valves are closed and to open said passage when said other valves are open.

13. In a device of the character described, an eduction tube including a valve housing, three aligned and connected valves therein, one of said valves being double ended and controlling the admission of pressure fluid into said tube, two of said valves controlling the admission of well liquid into said tube, the pressure fluid control valve being closed in both extreme positions thereof and open in its intermediate position and the one of said valves controlling admission of well liquid into the eduction tube being closed while the other is still open.

14. In a device of the character described, an eduction tube including a valve housing, three valve members aligned therein, one valve member preventing the entrance of well liquid into the eduction tube, a second valve member preventing such well liquid from rising in the eduction tube, a third valve member controlling the admission of pressure fluid into the eduction tube, no two of said members opening at the same time, no two of said members closing at the same time, one of said members being the first to open and the last to close; a check valve to prevent pressure fluid from contacting the producing formation of a well, in combination with a latching means to control the movements of said valve members.

ALEXANDER BOYNTON.